US006860493B2

(12) United States Patent
Orozco

(10) Patent No.: US 6,860,493 B2
(45) Date of Patent: Mar. 1, 2005

(54) NESTABLE CART

(75) Inventor: Miguel J. Orozco, Lakewood, CA (US)

(73) Assignee: Precision Wire Racks & Carts, Inc., Commerce, CA (US)

( * ) Notice: Subject to any disclaimer, the term of this patent is extended or adjusted under 35 U.S.C. 154(b) by 62 days.

(21) Appl. No.: 10/138,952

(22) Filed: May 3, 2002

(65) Prior Publication Data

US 2003/0205873 A1 Nov. 6, 2003

(51) Int. Cl.$^7$ .............................................. B62D 39/00
(52) U.S. Cl. ............................ 280/33.991; 280/47.34; 280/79.11
(58) Field of Search ....................... 280/33.991, 33.992, 280/33.997, 33.995, 33.996, 43.12, 47.34, 47.35, 79.11, 79.6, 79.7, 767

(56) References Cited

U.S. PATENT DOCUMENTS

| | | | | |
|---|---|---|---|---|
| 1,230,306 A | * | 6/1917 | Klay | 280/47.2 |
| 2,447,028 A | * | 8/1948 | Riddick | 280/491.1 |
| 2,688,493 A | * | 9/1954 | Rosenberg | 280/651 |
| 2,738,201 A | | 3/1956 | Spears | |
| 2,764,419 A | | 9/1956 | Enders | |
| 2,831,698 A | * | 4/1958 | Mills | 280/47.35 |
| 3,015,494 A | | 1/1962 | Fosbrook, Sr. | |
| 3,027,174 A | | 3/1962 | Garbarino | |
| 3,118,684 A | * | 1/1964 | Kappen | 280/33.997 |
| 3,147,021 A | * | 9/1964 | Lachance | 280/33.995 |
| 3,223,429 A | * | 12/1965 | Hastings | 280/641 |
| 3,429,403 A | * | 2/1969 | Drechsler et al. | 186/63 |
| 3,782,749 A | * | 1/1974 | Wiczer | 280/641 |
| 3,813,111 A | | 5/1974 | Ruger | |
| 4,480,851 A | * | 11/1984 | St-Pierre | 280/656 |
| 4,576,388 A | * | 3/1986 | Pope | 280/33.995 |
| 4,850,604 A | | 7/1989 | Le Marchand | |
| 5,033,757 A | | 7/1991 | Lloyd | |
| 5,149,114 A | * | 9/1992 | Lewandowski et al. | 280/33.992 |
| 5,547,205 A | * | 8/1996 | do Rosario Sousa de Cabedo | 280/30 |
| 5,556,118 A | | 9/1996 | Kern | |
| 5,662,342 A | * | 9/1997 | Basharat | 280/33.997 |
| 6,070,899 A | * | 6/2000 | Gines | 280/651 |
| 6,203,029 B1 | | 3/2001 | Ondrasik | |
| 6,260,863 B1 | | 7/2001 | Orozco et al. | |
| 6,450,514 B1 | * | 9/2002 | Ronca | 280/79.11 |
| 6,575,491 B2 | * | 6/2003 | Miller | 280/638 |
| 2001/0005070 A1 | | 6/2001 | Kemnitzer | |

FOREIGN PATENT DOCUMENTS

EP        0-352-647 A2    1/1990

* cited by examiner

Primary Examiner—Christopher P. Ellis
Assistant Examiner—Christopher Bottorff
(74) Attorney, Agent, or Firm—Gordon & Rees LLP

(57) ABSTRACT

A nestable cart has a generally flat base or platform supported on caster wheels and having sides which taper inwardly from the rear end to the front end of the platform. An upwardly extending handle frame extends upwardly from the rear end of the cart. An open area beneath the platform is designed to receive the front end of a platform of a second cart in order to nest two carts together. A nesting guide formation is provided at one end of the platform to guide two platforms into nesting engagement while lifting the rear wheels of a front cart from the ground during nesting of a rear cart into the front cart. The guide formation may be one or more rotating members such as rollers or guide wheels.

46 Claims, 6 Drawing Sheets

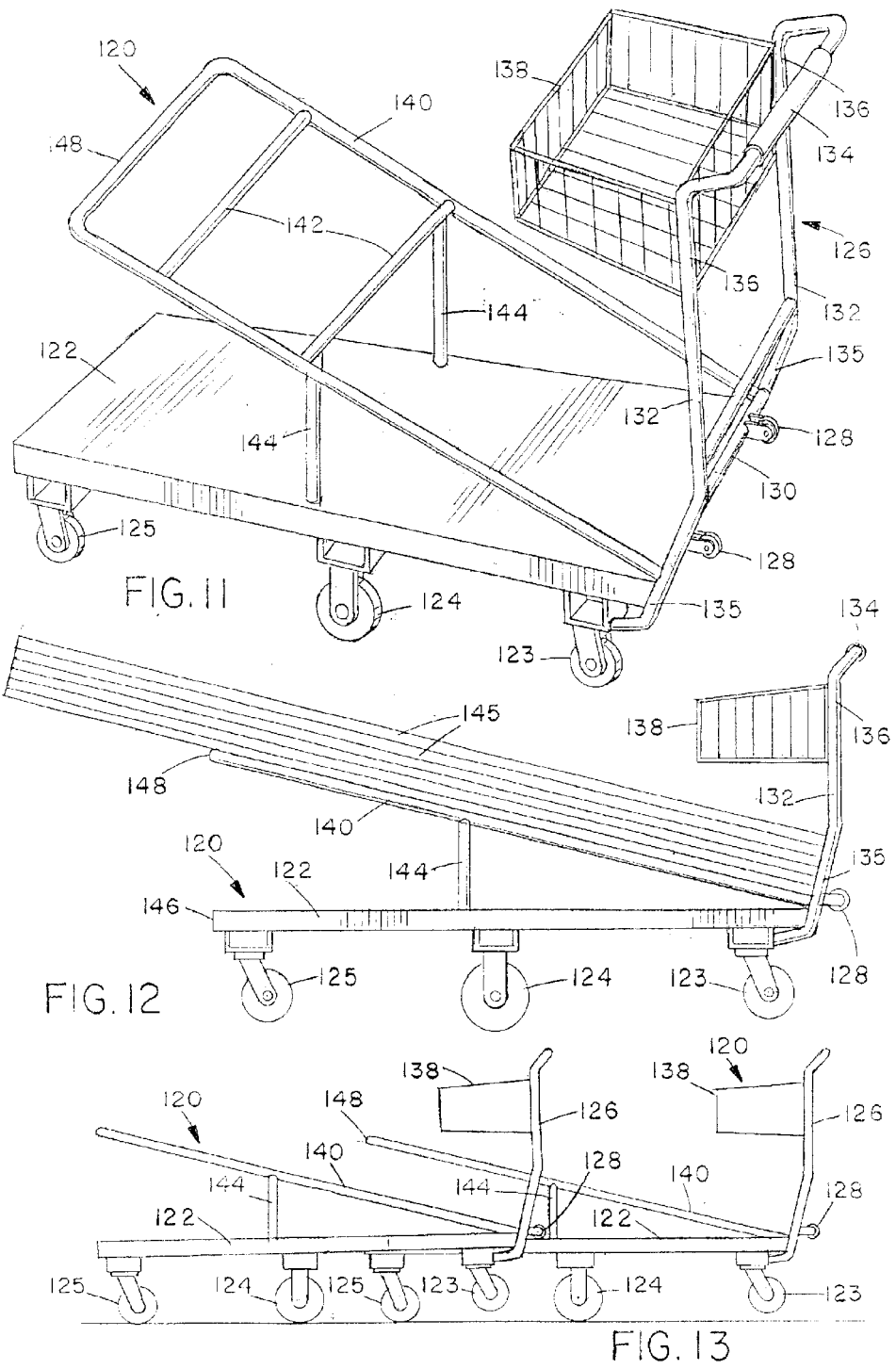

NESTABLE CART

BACKGROUND OF THE INVENTION

The present invention relates generally to wheeled carts as used in various types of stores for carrying selected goods to a checkout stand and subsequently to a vehicle in the store parking lot, and is particularly concerned with carts having a wheeled base and a handle projecting upwardly from the rear end of the base.

There are many different types of wheeled carts which are used for carrying items from one place to another, including the types of cart normally used in various types of stores, as well as carts or dollies used in industrial applications for moving materials, and luggage carts. Most such carts have a wheeled base, which may or may not have a platform for supporting items, and a handle projecting upwardly from the rear end of the base. Shopping carts used in grocery stores and the like to transport a number of relatively small items generally have a basket spaced above the wheeled base. Other, larger carts are used to transport larger items, either in stores, warehouses, or elsewhere, such as building or construction materials, electronics or other equipment, furniture, domestic appliances or the like. These include platform or flat bed carts which have a base comprising a generally flat platform for supporting goods, and no other storage areas. Lumber carts are used in hardware or construction material stores for carrying beams, panels and the like.

Some types of carts, particularly shopping carts, are designed to nest together in lines for storage and transportation purposes. Others, such as lumber carts and flat bed carts, often are not nestable and therefore take up a considerable amount of storage space when not in use. Some nesting arrangements are relatively complex, including hinged rear walls or bases which must pivot upwardly or inwardly in order to permit nesting. This has the disadvantage that any damage to the pivoting arrangement or adjacent areas of a cart may result in jamming, such that two carts can no longer be readily separated.

U.S. Pat. No. 6,203,029 of Ondrasik describes a nestable flat bed cart in which the base platform or deck has a rear, hinged portion which can lift up in order to allow the forward end of the platform of another cart to be nested under it. This does conserve some space, but it does require the base platform to include moving parts, and does not allow the forward end of a rear cart to be nested fully up to the forward end of the cart in front.

SUMMARY OF THE INVENTION

It is an object of the present invention to provide a new and improved nestable cart.

According to the present invention, a nestable cart is provided, which comprises a generally flat platform having a front end, a rear end, opposite sides, and a central longitudinal axis, the opposite sides of the platform tapering inwardly from the rear to the front end of the cart, and the platform having a downwardly facing open area extending from the rear end to the front end, a plurality of wheels supporting the platform above the ground, an upwardly extending handle frame extending upwardly from the rear end of the cart, and the platform being fixed and having no parts which move relative to the handle frame, whereby the front end of the platform of a second identical cart can be nested under the platform of the first-mentioned cart and into the downwardly facing, open area such that the platform of the second cart is positioned beneath the platform of the first-mentioned cart.

In an exemplary embodiment of the invention, one or more rotatable members such as casters, wheels, rollers, bearings, or the like may be provided either at the rear end or the front end of the platform, for assisting with nesting of the carts. If provided at the rear end of the platform, the rotating member or members are designed to engage the front end of a second cart as it is pushed into the first cart from behind, and then roll smoothly over the flat upper surface of the platform of the second cart as it is pushed under the platform of the cart in front. It will be understood that the rear wheels of the forward cart will be lifted from the ground as the rear cart platform is pushed underneath the front cart platform. In the alternative arrangement, where one or more rotating members are provided at the front end of the platform, these will engage the flat undersurface of the platform of the front cart as a second cart platform is pushed underneath. In either case, the rotating member or members will assist in the smooth nesting of the platform of one cart under the platform of the cart in front. Also, wear on the rear wheels is reduced as a line of carts is transported.

When a series of several carts are nested together in a row or line, all the rear wheels except for those of the rearmost cart will be lifted from the ground, so that a row of carts may be readily maneuvered, for example from a parking lot back into a store. The platform is flat and fixed relative to the wheels and rear handle frame, with no hinges which are potentially subject to failure, and items will therefore be supported in a reliable and stable manner. The rotating members will tend to reduce drag or resistance when the platform of one cart is pushed under the platform of the cart in front, and also when the procedure is reversed to separate two nested carts, reducing the risk of nested carts jamming together such that they cannot be used.

The cart of this invention has a much simpler, more reliable, and easy to use nesting arrangement than was previously available. The ability to readily nest relatively larger platform or lumber carts will significantly reduce storage space required for such carts.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which:

FIG. 11 is a perspective view of flat bed cart according to another embodiment of the invention;

FIG. 12 is a side view of the cart of FIG. 11, illustrating panels or beams loaded on the cart;

FIG. 13 is a side view illustrating two carts of the type illustrated in FIGS. 11 and 12 nested together;

DETAILED DESCRIPTION OF THE DRAWINGS

Figure 1:
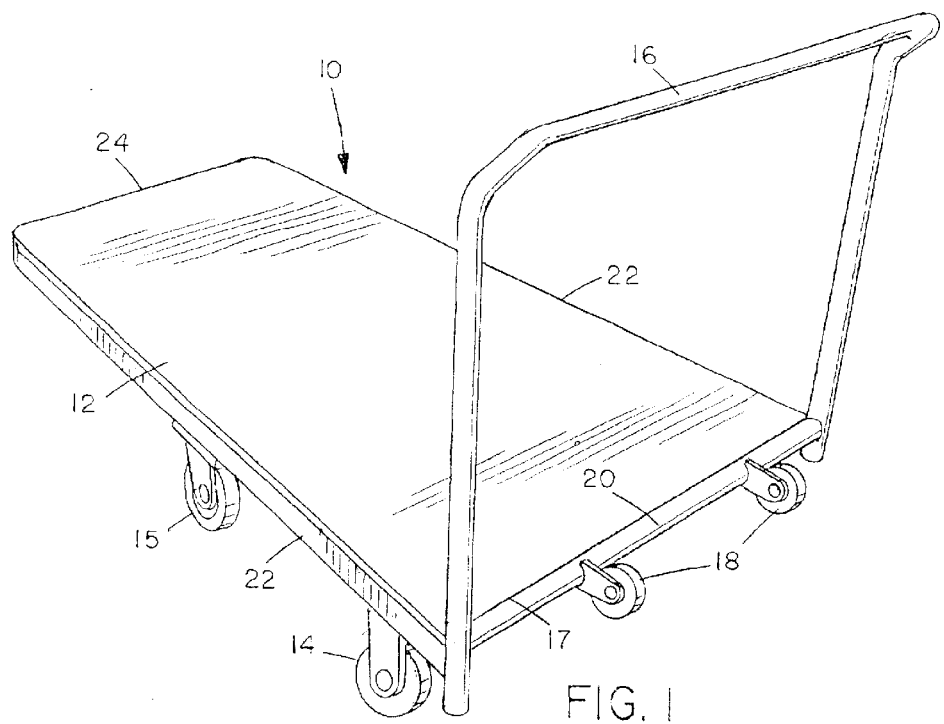
FIG. 1 is a perspective view of a flat bed cart according to a first embodiment of the invention incorporating the nesting guide rollers at the rear.
Figure 5:
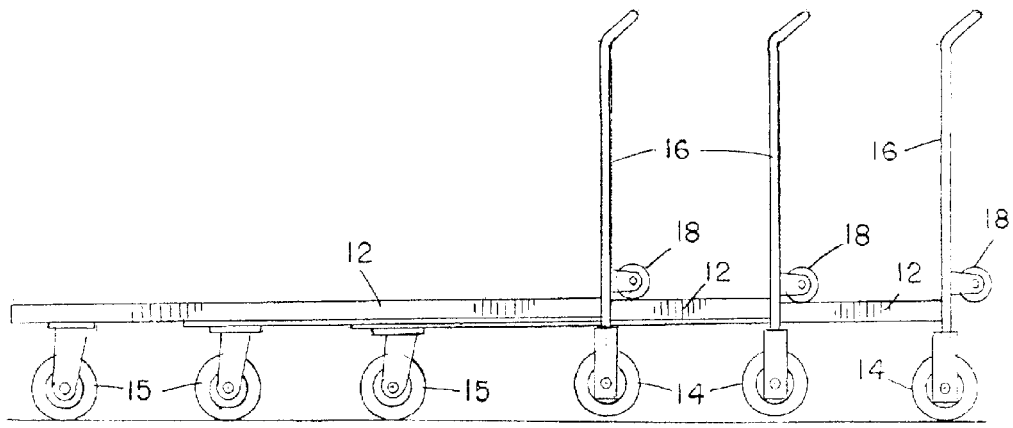
FIG. 5 is a side view showing three nested carts of the type shown in FIG. 1 or 2.
Figure 6:
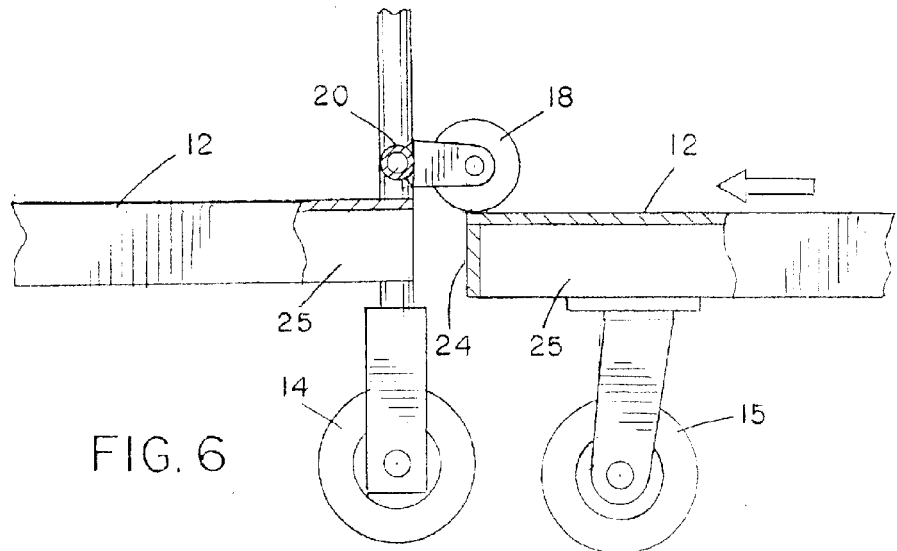
FIG. 6 is an enlarged side view, with portions cut away, showing the initial nesting engagement.

FIG. 1 of the drawings illustrates a nestable cart 10 of the flat bed or platform type according to a first embodiment of the invention, while FIGS. 5 and 6 illustrate nesting of a plurality of carts 10. The cart 10 basically comprises a flat base or platform 12 carried on a pair of rear caster wheels 14 and a pair of forward caster wheels 15 spaced forwardly from wheels 14, and an upright handle frame 16 projecting upwardly from the rear end 17 of platform 12. A pair of nesting guide wheels or casters 18 project rearwardly from a cross bar 20 at the rear end of platform 12, adjacent the rear end 17 of the platform.

Platform 12 has inwardly tapering sides 22 extending from its rear end to front end 24. It has a downturned rim extending along the sides and front end to form a downwardly facing recessed or open area 25, as indicated in FIG. 6, with the rear end being open. The platform is fixed relative to the handle frame 16 and caster wheels, and has no moving parts or hinges other than the wheels. It therefore provides a fixed and stable, horizontal surface for supporting one or more items as they are transported from one place to another. Although the platform 12 in the illustrated embodiment is formed from a flat sheet of metal, plastic or the like, it will be understood that it may alternatively be of wire or plastic grill construction or the like, as commonly used in such carts.

When the platform cart 10 is not in use, it can be readily nested together with a plurality of such carts for storage purposes, minimizing storage space requirements, as illustrated in FIGS. 5 and 6. As indicated in FIG. 6, a first cart is pushed in to the rear end of a second cart, until the nesting guide wheels 18 on the second, forward cart engage the front end 24 of the platform 12 of the first, rearward cart. The size and position of the guide wheels 18 is such that the rim of the wheels will extend slightly below the upper surface of the platform 62, so that they will ride up over the upper surface of the rearward cart. This will tend to lift the rear caster wheels 14 of the second cart from the ground, making it easier to continue to push the first cart inwardly with the platform 12 of the first cart entering the space 25 beneath the platform 12 of the second cart. At the same time, since the lowermost portion of the rims of the wheels 18 is spaced below the lower surface of platform 62, as can be seen in FIG. 6, there will be a clearance between the lower surface and the upper surface of the rearward cart as the carts are nested together. This permits the first or rearward cart to be pushed inwardly into nesting engagement with the forward cart until the front end 24 of the first cart is located near to the front end of the second cart. The rollers or guide wheels 18 will reduce drag as the carts are nested together. FIG. 5 illustrates three carts 10 fully nested together in this manner. The front caster wheels 15 of all three carts remain on the ground, but the steerable rear wheels 14 of all but the rearmost cart are raised above the ground. This will make it easier to maneuver a row of nested carts from one place to another, for example from a store parking lot back into a store.

This arrangement also makes it easier to retrieve a nested cart from the rear of a row of such carts. A rearward pull on the cart will allow it to slide easily out from its nested position, with the guide wheels 18 of the cart in front again rolling over the platform of the rear cart as it is pulled out, reducing drag. Since the nesting involves no hinged parts which must be pushed up, or other complex nesting mechanisms, the risk of two carts becoming jammed together and therefore unusable is considerably reduced. This therefore provides a cart with a stable platform fixed to the wheelbase and handle, reducing rattling or other vibrational noise as the cart is pushed around and providing a more secure surface for supporting items during transportation. At the same time, the cart can be readily nested and retrieved from nesting, considerably reducing storage space requirements and avoiding the problems of some prior nesting mechanisms.

Figure 8:
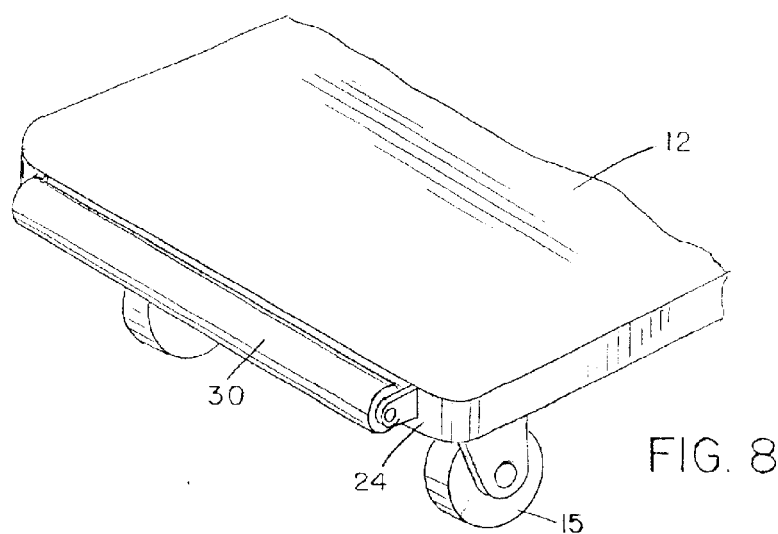
FIG. 8 is a perspective view showing a roller on the front end of a cart.
Figure 9:
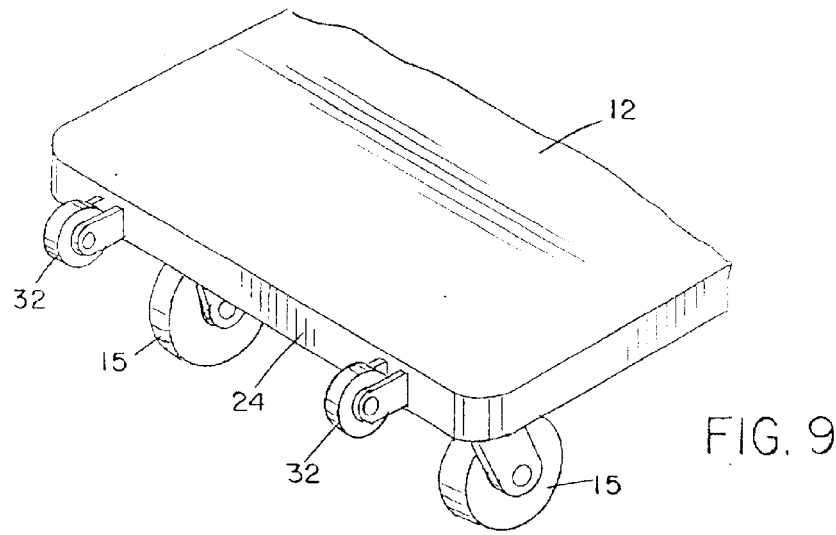
FIG. 9 is a similar view showing separate front guide rollers.
Figure 10:
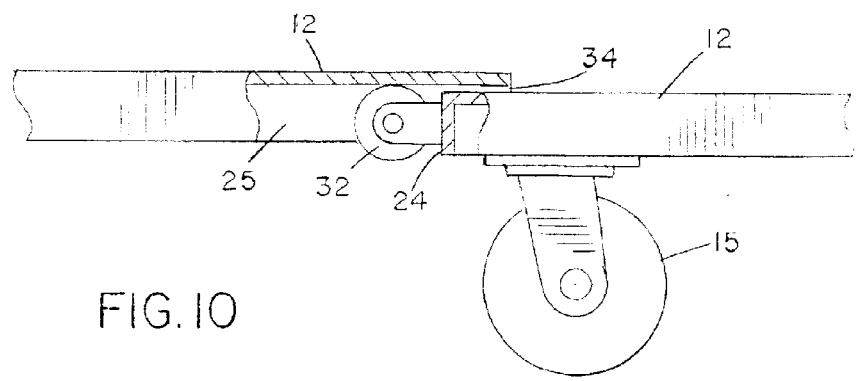
FIG. 10 is a side view showing the initial nesting engagement of the front roller configuration.

Although guide wheels 18 are provided at the rear of the cart 10 for reducing drag during nesting, in practice any rotating device could be used for this purpose, such as a single cylindrical roller, a bearing, or the like. Also, instead of providing guide wheels or rollers at the rear end of the cart, the nesting guide mechanism may instead be provided at the forward end 24 of the cart 10, for example as illustrated in FIGS. 8 to 10. These drawings illustrate the forward end of a modified cart which is identical to that of FIGS. 1, 5 and 6, apart from the nesting guide mechanism, and like reference numerals have been used for like parts as appropriate. In the alternative illustrated in FIG. 8, a single, cylindrical roller 30 is provided on the front end 24 of the platform or flat bed 12. In FIG. 9, the nesting guide mechanism comprises a pair of rollers or guide wheels 32 rotatably mounted on the front end 24 of the platform 12. FIG. 10 illustrates nesting engagement between two carts with forward guide wheels 32 (or a single roller 30). As a rear cart is pushed into the rear end of a forward cart, the rollers or wheels 32 will first engage the rear end 17 of the platform of the cart in front. This will lift the platform up, raising the rear caster wheels 14 of the front platform from the ground. As the platform of the rear cart continues to be pushed forwardly into space 25, the wheels or rollers 32 will maintain a clearance 34 between the platform 12 of the rear cart and that of the front cart, reducing or eliminating any risk of drag or friction between the lower surface of the front platform and the upper surface of the rear platform. A similar clearance will be produced by rollers or wheels 18 in the embodiment of FIGS. 1, 5 and 6 (see FIG. 6). This ensures that the carts can be easily nested together, without requiring any force, and reducing any risk of the carts becoming jammed together in the nested condition.

Although the nesting guide arrangement in these embodiments comprises one or more rollers, bearings, wheels, or cylinders, in alternative embodiments the rotatable members may be eliminated and replaced with a suitably shaped, rounded guide surface at the front or rear end of the cart. In another alternative, such guide mechanisms may be eliminated altogether to provide a simpler cart construction. In that case, it will still be possible to nest the carts together, although more force will be required to push the rear cart platform 12 into the space 25 under the platform of the cart in front. The carts will then be identical to that of FIG. 1, but eliminating guide wheels 18 and the associated support brackets.

Figure 2:
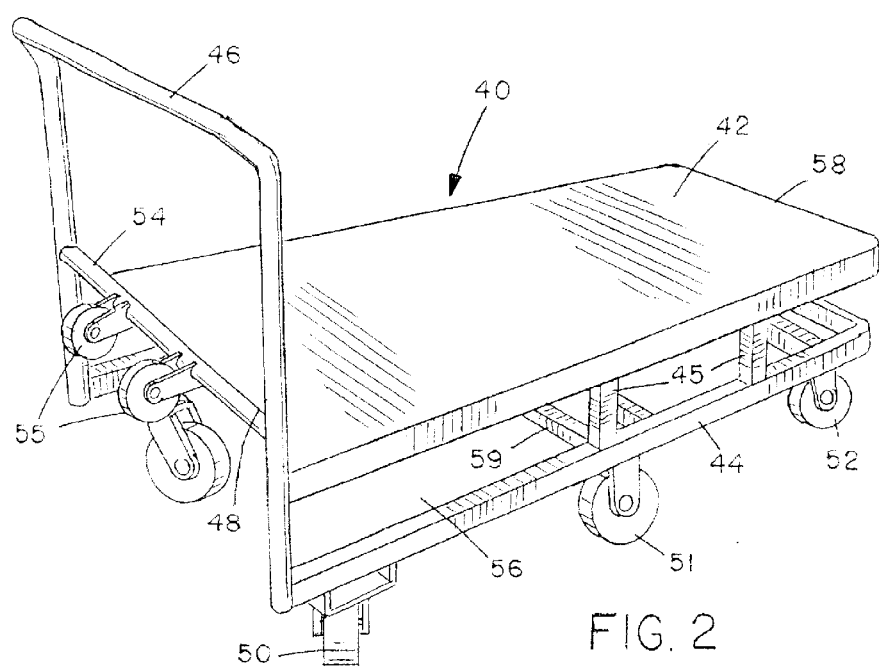
FIG. 2 is a similar view of an alternative cart configuration.

The nesting arrangement of FIGS. 1, 5, 6, and 8 to 10 may also be provided on other types of load transporting carts, either flat bed or other cart types. FIG. 2 illustrates a platform or flat bed cart 40 in which the platform or bed 42 is raised above the wheel support frame 44 via posts 45 which secure the platform to the frame 44. A handle frame 46 similar to frame 16 of FIG. 1 projects upwardly from the rear end of the wheel support frame 44, and the rear end 48 of the platform 40 is suitably welded to the two uprights of frame 46 as well as to posts 45 so that the platform extends forwardly in a horizontal orientation from the handle frame.

The wheel support frame 44 supports three spaced pairs 50,51 and 52 of caster wheels, one pair 50 being located at the rear end of the frame, one pair 51 at a generally central location, and one pair 52 adjacent the front end of the cart. A cross bar 54 extends between the handle frame uprights at a location spaced slightly above the rear end 48 of the platform, and a pair of nesting guide wheels 55 are mounted on the cross bar 54 so as to project rearwardly, in a similar manner to guide wheels 18 of FIG. 1. The guide wheels 55 act in the same way as the guide wheels 18 of FIG. 1 when two carts are nested together, engaging the front end of the platform of a rearward cart as it is pushed into the space 56 beneath the front cart platform 42, such that the rear end of the front platform 42 is lifted slightly from the ground and the rear cart platform 42 can be pushed into the space beneath it as the wheels 55 roll over the top surface of the platform. In this case, the rear cart can only be pushed inwardly until the front end 58 of the rear cart reaches the cross bars 59 of the wheel support frame, but this will still significantly reduce the storage space otherwise required for two such carts. Both the rear and center wheels 50, 51 will raise from the ground when nested, reducing wear on the wheels when a line of nested carts is moved.

The guide wheels or rollers 55 at the rear end of the cart may be replaced with similar guide wheels at the front of cart 40, as in FIGS. 9 and 10, or with a single cylindrical roller or bearing at the front or rear end, as in FIG. 8. Alternatively, the nesting guide mechanism may be a fixed, rounded surface at the front or rear of the platform, as discussed above in connection with the embodiment of FIGS. 1, 5 and 6. As in the previous embodiment, a platform cart as illustrated in FIG. 2 will be readily nestable with other such carts, without drag or friction and with reduced risk of nested carts becoming jammed or stuck together.

In both of the previous embodiments, the nesting guide rollers or other nesting guide devices may be eliminated altogether, with the platforms inclined slightly downwardly from the rear to the front end of the cart so as to provide some clearance as the front end of one cart is pushed into the rear end of another cart. The inclination will be small enough to avoid the risk of items sliding off the cart. Even with no such inclination, nesting will still be possible without any guide rollers or the like, although it will be harder to nest carts together due to the drag or friction between the upper surface of the rear platform and the lower surface of the platform of the front cart as the carts are pushed together. Although this version will not nest as smoothly, it is still an improvement over prior carts which would not nest at all, or carts with very complex nesting mechanisms requiring hinged or pivoting parts on the base or platform.

Figure 3:
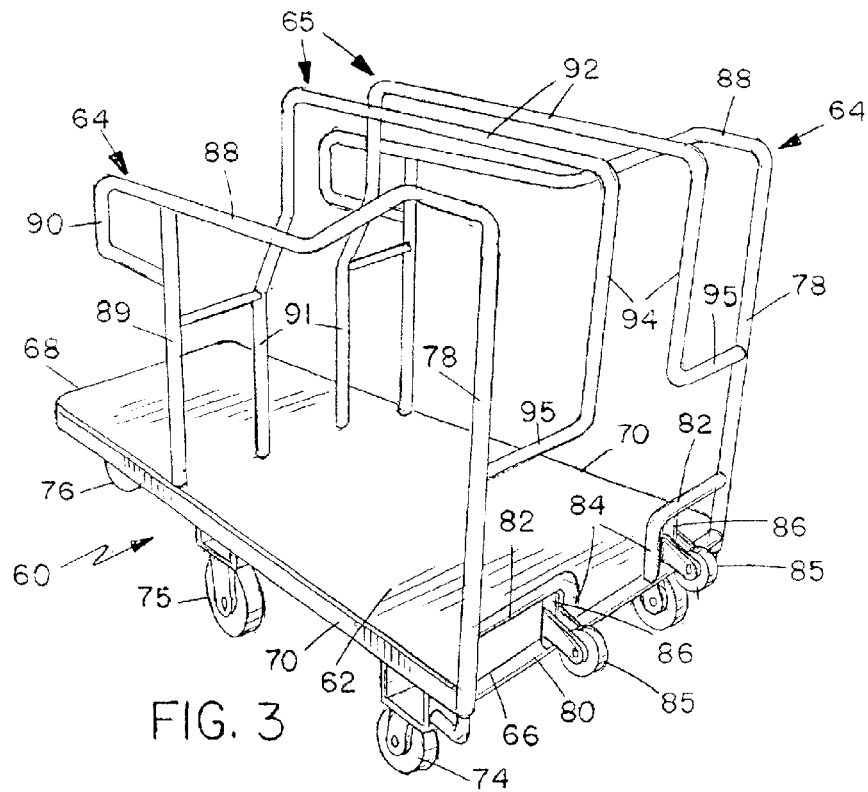
FIG. 3 is a similar view of an alternative lumber cart configuration.

FIG. 3 illustrates an alternative, lumber cart 60 which is arranged to permit nesting in a similar manner to the embodiment of FIG. 1. The cart basically comprises a wheeled base 62, a pair of upright outer side frames 64 extending upwardly from opposite sides of the base, and a pair of spaced inner upright frames 65. The spaces or channels between each adjacent pair of upright frames are designed to hold wall panels, lumber, beams, posts, window panes or the like, in a manner known in the field, as also described in U.S. Pat. No. 6,260,863 of Orozco et al., directed to a Nestable Lumber Cart, the contents of which are incorporated herein by reference.

The base 62 comprises a generally flat platform which may be of sheet metal as illustrated, or alternatively of metal or plastic grille construction or the like. Platform 62 is of similar shape and configuration to that of the platform cart of FIG. 1, having a rear end 66, a front end 68, and opposite sides 70 which taper gradually inwardly from the rear end to the front end of the cart. As in the previous embodiments, the platform 62 has a downturned peripheral rim 72 which extends along the sides and front end of the cart, but is open at rear end 66 to permit nesting. Downwardly depending pairs 74,75,76 of caster wheels are provided at the rear end, center, and front end of the base 62, in a conventional manner.

Each outer side frame 64 has a rear upright 78 at the respective rear corner of the platform 62. A cross bar 80 extends between the lower ends of uprights 78 and across the rear end 66 of the platform 62. A pair of support bars 82 are also provided at the rear end of the cart, each extending inwardly from a respective upright 78 towards the other support bar, and having a downturned end 84 short of the center of the bar 80 which is welded to cross bar 80 at its lower end. A pair of nesting guide wheels 85 are rotatably mounted at the rear end of the cart on respective supports 86 each secured between the cross bar 80 and a respective one of the support bars 82. The guide wheels 85 will operate in an equivalent manner to the guide wheels 18 of FIG. 1 during cart nesting and subsequent separation of nested carts.

Each outer side frame 64 also includes a forwardly extending side rail 88 formed integrally with and extending from the upper end of rear upright 78, and a forward upright 89 extending upwardly from the respective side of platform 62 at a location spaced rearwardly from the front end 68 of the platform. Rail 88 is welded to the upper end of upright 89, and extends in a generally U-shape forwardly from upright 89 and then rearwardly to the upright 89 to form a forwardly projecting U-bend portion 90.

The inner side frames 65 each have a forward upright 91 spaced inwardly from, and aligned with, the respective uprights 89 of the outer side frames, a generally horizontal rail 92 formed integrally with, and extending rearwardly from, the upper end of upright 91, a rear rail 94 extending downwarldy from the rear end of rail 92 at the rear end of the cart, and an outwardly bent rail portion 95 at the lower end of rail 94 extending outwardly and welded to the rear upright 78 of the respective outer side frame. It can be seen that the forwardly projecting U-bend portions 90 are spaced above rail portions 95 at the rear end of the cart. Thus, when two identical carts 60 are nested together, the forward U-bend portions 90 of the rearmost cart can nest into the space above rail portions 95 of the forward cart.

Nesting of the base or platforms 62 of two of the carts 60 will be carried out in exactly the same way as described above in connection with FIGS. 1, 5 and 6. The front end 68 of a rear cart will be pushed in towards the rear end 66 of the forward cart, until the nesting guide rollers 85 meet the front end 68 of the cart being nested. They will then lift up over the front end 68 and onto the top surface of the platform 62 of the rear cart, simultaneously lifting the rear and center caster wheels 74, 75 of the front cart from the ground, and providing clearance between the top surface of the rear cart platform and the lower surface of the front cart platform so that the rear cart platform can readily be pushed into nesting engagement under the front cart platform.

Figure 4:
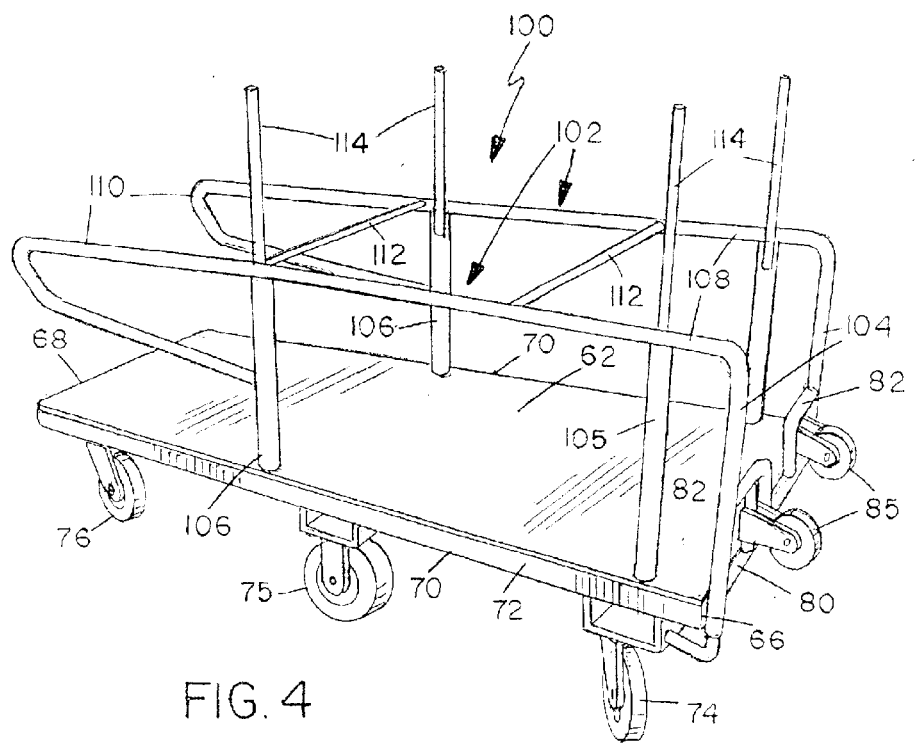
FIG. 4 is a similar view of a further cart configuration.

FIG. 4 illustrates a modified lumber cart 100 which has an equivalent nesting platform arrangement to that of FIG. 3, and like reference numerals have been used for like parts as appropriate. The only difference between the embodiment of FIG. 3 and that of FIG. 4 is the design of the spaced frames for supporting lumber, panels or the like. The arrangement is such that, if desired, lumber carts 60 of the type shown in FIG. 3 can readily be nested with carts 100 of the type illustrated in FIG. 4.

Rather than two outer side frames 64 and two inner side frames 65, the cart 100 has only two outer side frames 102, each having a rear upright 104 and a pair of forwardly spaced uprights 105 and 106, with the front upright 106 being spaced slightly forwardly from the center of the cart. The rear upright 104 has an integrally formed, forwardly projecting horizontal rail 108 which extends across, and is welded to, the upper ends of uprights 105 and 106, and a forwardly projecting, U-bend portion 110 projecting forwardly from front upright 106. Spaced horizontal cross bars 112 extend between the horizontal side rails 108. Upright support posts 114 project upwardly from the uprights 105 and 106 to provide added support to items placed on top of the cross bars 112. This arrangement therefore provides support for panels or beams placed between the side frames on platform 62, as well as items placed on top of cross bars 112.

Figure 7:
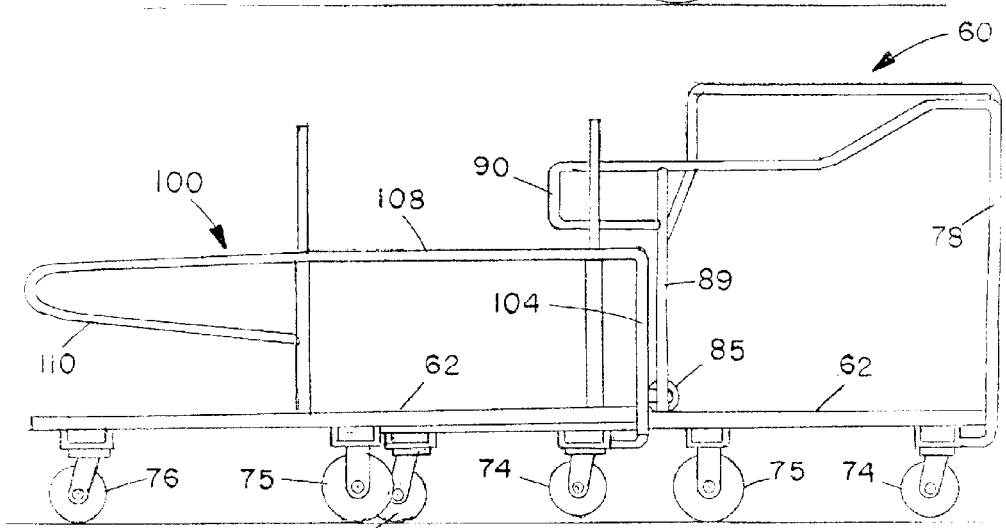
FIG. 7 is a side view showing the nesting of carts shown in FIGS. 3 and 4.

FIG. 7 illustrates nesting of a lumber cart 60 as illustrated in FIG. 3 with an alternative lumber cart 100 of the type illustrated in FIG. 4. The forward end 68 of cart 60 is pushed under the platform 62 of cart 100, with the nesting guide rollers 85 of cart 100 engaging and rolling over the upper surface of platform 62 of cart 60, in the manner described above in connection with the cart of the first embodiment of FIGS. 1, 5 and 6. Rear caster wheels 74 of the cart 100 are thereby lifted from the ground. At the same time, the forward U-bend portions 90 of the side frames 64 of cart 60 will extend into the space between the side frames 102 of cart 100. Clearly, cart 100 could alternatively be nested into the back of a cart 60, or two or more carts 60 or carts 100 could also be nested in the same manner. This allows more than one type of lumber cart to be available at a building materials store, with the customer selecting the appropriate type according to the types of material to be purchased. At the same time, both types can be nested together when not in use, reducing storage space requirements for carts. Nested carts can also be more readily moved from place to place, with the rear wheels of all but the rearmost cart lifted from the ground to enable more easy maneuvering of a row of nested carts in a parking lot or the like.

As in the embodiments of FIGS. 1 and 2, the rearwardly projecting, nesting guide wheels 85 may be replaced with a single cylindrical roller or bearing, or other rotating devices, or even a fixed curved guide surface. Rather than providing the nesting guide structure at the rear end of the cart, it may alternatively be provided at the front end 68 of the platform, as illustrated in FIGS. 8 to 10 for the first embodiment of the cart.

FIGS. 11 to 13 illustrate a nestable cart 120 according to another embodiment of the invention. The cart 120 has a flat bed or platform 122 carried on three spaced pairs of caster wheels 123,124,125, and an upright handle frame 126 projecting upwardly from the rear end of the platform 122. A pair of nesting guide wheels or casters 128 project rearwardly from a cross bar 130 extending between opposite sides of the handle frame adjacent the rear end of the platform, similar to the nesting guide wheels of the previous embodiments. However, unlike the previous embodiments, the cart 120 of FIGS. 11 to 13 has additional storage devices for carrying a variety of different items, in addition to the flat platform 122.

As best illustrated in FIG. 11, the handle frame 126 has a pair of spaced uprights 132 connected together by a cross bar or handle bar 134 at their upper ends. The uprights 132 include a first, rearwardly angled portion 135 followed by an upright or vertical portion 136. A basket 138 for carrying small items is secured between the uprights adjacent the upper end of vertical portion 136, and projects forwardly from the uprights as indicated in FIGS. 11 and 12. A tilted, generally U-shaped support frame 140 is secured to the uprights 132 adjacent their lower ends, and extends forwardly at an upwardly inclined angle over the platform over substantially the entire length of the platform. The frame 140 has a pair of cross bars 142 extending between its side legs, for added support, and a pair of vertical support rods 144 extend upwardly from opposite sides of the platform 122 and are secured to opposite sides of frame 140 at their upper ends.

The inclined support frame 140 provides a convenient location for holding long items such as planks, poles, beams, panels, windows or the like, such as the stack of panels 145 indicated in FIG. 12. At the same time, additional storage for other items is provided on the platform 122 beneath frame 140, and small items can be carried in basket 138 for added convenience. This allows a large number of different items of various shapes and sizes to be carried easily on the same cart, both while shopping and while transporting purchased items to a vehicle. The panels 145 or other elongate items project forwardly from the end of the cart, but the upward inclination of frame 140 reduces the risk of the panels being dislodged or slipping off the frame. At the same time, the panels 145 can be readily moved from frame 140 into a vehicle trunk or truck bed, since they are raised at their projecting ends to a position above the level of a typical truck bed, so that they can be simply slid from the frame into the vehicle, rather than having to lift the entire stack from a lower position to the height of the vehicle, as would be necessary if they were carried on a flat horizontal base platform.

As in the previous embodiments, the platform 122 has a downturned rim extending along the tapered side edges and front end, with the rear end being open to receive the front end of a platform being nested together with the cart. Thus, the cart 120 of FIGS. 11 and 12 can be readily nested with another identical cart in the same way as the carts of the previous embodiments, as indicated in FIG. 13. A first cart will be pushed into the rear end of a second cart, with the front end 146 of the platform of the first cart engaging the nesting guide wheels 128 of the second cart, which will ride up and onto the upper surface of the platform of the rear cart. This also lifts the front cart at its rear end to enable the rear cart's platform to nest underneath the front cart platform. At the same time, the forward end 148 of the inclined support frame 140 of the rear cart will extend into the space between basket 138 and the frame 140 of the front cart, as indicated in FIG. 13.

The embodiment of FIGS. 11 to 13 provides a very versatile cart capable of carrying a variety of different size and shape items, such as construction materials of various kinds, tools, and consumer items such as furniture, electrical appliances, and the like. Although the base is a flat panel and the inclined support is an open framework in the illustrated embodiment, it will be understood that the base panel may alternatively be an open framework or grille structure, and the inclined support may alternatively be a flat sheet or panel, like platform 122 in the illustrated embodiment.

Also, as in the previous embodiments, nesting guide wheels may alternatively be provided on the front end of platform 122. The guide wheels may be replaced with a single elongate roller or bearing, as in FIG. 8.

Figure 14:
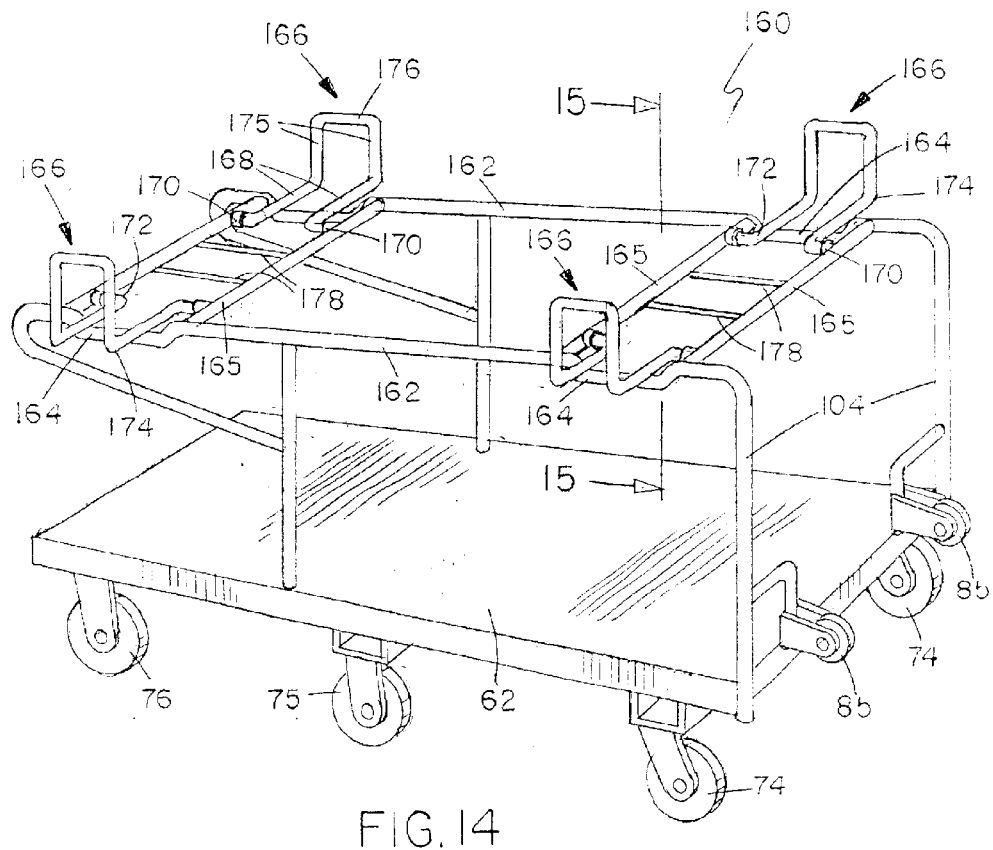
FIG. 14 is a perspective view of an alternative lumber cart configuration.
Figure 15:
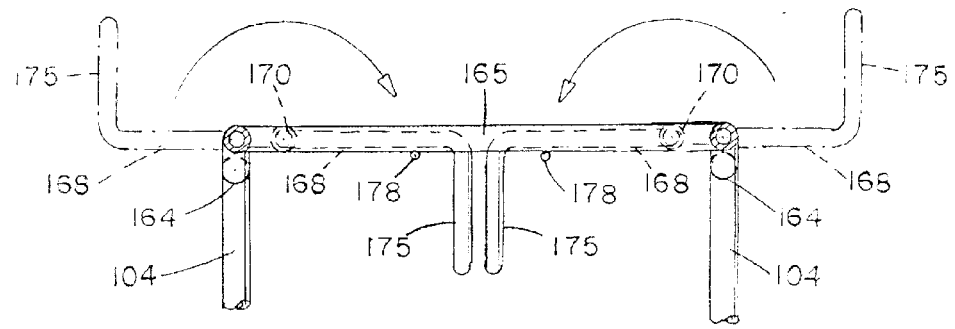
FIG. 15 is a view on lines 15—15 of the cart of FIG. 14 with the extendible material support wings folded for nesting purposes.

FIGS. 14 and 15 illustrate a modified lumber cart 160 with additional supports for carrying materials above the platform. This lumber cart 160 has a nestable base identical to that of the cart 100 of FIG. 4, and like reference numerals have been used for like parts as appropriate. However, the vertical posts 114 for side support of items placed over cross bars 112, are eliminated in this embodiment. Instead, the side frames 102 of cart 160 have top bars 162 with spaced recessed regions 164, and two pairs of cross bars 165 extending between the top bars 162, one cross bar of each pair located on each side of the respective recessed regions 164. A pair of angled wing members 166 are mounted in each of the recessed regions. Each wing member comprises a generally U-shaped bar with a pair of legs 168 having a first end pivotally mounted on a respective cross bar 165 via pivot joint 170. The legs have a first bend 172 adjacent the pivot joint and then extend outwardly parallel to one another in the deployed position of FIG. 14 up to a second perpendicular bend 174. The legs then project upwardly along upstanding leg portions 175, and are connected together by connecting portion 176 at their upper ends.

The pivot mounts 170 permit the wing members to be rotated between the outwardly extending, deployed position of FIG. 14 and the inwardly folded, storage position of FIG. 15. In the deployed position, each wing member projects outwardly from the side frames and then upwardly, forming an extended support for items which may be laid across the cross bars 165 and the outwardly extending, flat portions of the wing members, with the upwardly extending leg portions 175 retaining such items on the cart.

When the cart 160 is to be nested with other such carts for storage, all that is necessary is that each wing member 166 is rotated inwardly into the space between the respective cross bars 165, with the portions 175 projecting downwardly and adjacent one another, as indicated in FIG. 15. A suitable stop pin or bar 178 is provided for holding the wing members in the storage position. In this position, the cart can be readily nested with another identical cart in the manner illustrated in FIG. 7, for example, since the wing members will not project outwardly and prevent nesting. Thus, an extended support can be provided for items on top of the side frames, cross bars, and wing members, in addition to the platform 62, so that more materials can be carried on cart 160, without detracting from the nesting ability of the cart.

It will be understood that the wing members need not be pivotally mounted, but could alternatively be made extendible in some other manner, for example by making the leg portions extending between the first and second bends 172,174 out of two telescoping parts, such that they can be simply pulled out into the deployed position of FIG. 14. When the cart is to be stored, the telescoping leg parts could simply be telescoped inwardly until the upstanding leg portions 175 no longer project out from the respective sides of the cart. Additionally, the wing members may be pivotally secured to the top bars 162 of the side frames, rather than cross bars 165.

The nesting mechanism of this invention may be used for nesting of any type of article carrying cart which has a generally flat base or platform, including flat bed carts, lumber carts, luggage carts, shopping carts or the like. The mechanism eliminates any need for the base or platform to be pivotally mounted on the wheel frame, or having any pivotally mounted or hinged parts on the base. This reduces complexity, reduces rattling noise as the cart is wheeled around, and also reduces the risk of nested carts becoming jammed together or the hinge mechanism failing. The use of a rigidly mounted base platform with no relatively moving parts, other than the rotatable guide wheel or rollers, provides a more stable, flat and uniform surface for supporting items to be transported. The use of rotatable members to guide the platform of a rear cart into nesting engagement beneath the platform of a forward cart will reduce or eliminate drag during nesting of the carts and subsequent separation of the carts, further reducing the risk of carts becoming jammed together. The lifting of the rear and center wheels of the forward carts when nested also has the advantage of reducing wear on the wheels when a line of such carts is transported.

Although some exemplary embodiments of the invention have been described above by way of example only, it will be understood by those skilled in the field that modifications may be made to the disclosed embodiments without departing from the scope of the invention, which is defined by the appended claims.

I claim:

1. A nestable cart, comprising:

a generally flat platform having a front end, a rear end, and opposite sides, the opposite sides of the platform tapering inwardly from the rear to the front end of the cart;

the platform having a downwardly facing open area extending from the rear end to the front end, the open area being open at the rear end of the platform;

a plurality of wheels supporting the platform above the ground;

an upwardly extending handle frame extending upwardly from the rear end of the cart;

the platform being fixed and having no parts which move relative to the handle frame, whereby the front end of the platform of a second identical cart can be nested under the platform of the first-mentioned cart and into the downwardly facing, open area such that the platform of the second cart is positioned beneath the platform of the first-mentioned cart; and an inclined support member having a width substantially equal to the width of the platform, the support member having a rear end secured adjacent the rear end of the platform, and a forward end, the support member being inclined upwardly relative to the platform from its rear end to its forward end, and comprising means for supporting additional items at a spacing above the platform;

the inclined support member having a length substantially equal to the length of the platform.

2. The cart as claimed in claim 1, including at least one rotatable member mounted on the cart and extending rearwardly from the handle frame adjacent the rear end of the platform, the rotatable member comprising guide means for engaging the platform of a second cart as it is nested under the platform of the first-mentioned cart.

3. The cart as claimed in claim 2, wherein the rotatable member comprises an elongate roller.

4. The cart as claimed in claim 2, including two rotatable members.

5. The cart as claimed in claim 4, wherein the rotatable members comprise guide wheels.

6. The cart as claimed in claim 1, including at least one rotatable member mounted on and extending forwardly from the front end of the platform for engaging under the platform of a forward cart as the first-mentioned cart is nested into the space under the platform of the forward cart.

7. The cart as claimed in claim 1, including a basket having a rear end secured to the handle frame and projecting forwardly from the handle frame at a location spaced above the platform.

8. The cart as claimed in claim 7, wherein the handle frame comprises a pair of spaced upright members projecting upwardly from the rear end of the platform, and a handle member extending between the upper ends of the upright members, and the basket is secured between the upright members adjacent the handle member, the basket having a forward end spaced rearwardly from the forward end of the platform, the basket having a length less than half the length of the platform.

9. The cart as claimed in claim 1, including a basket secured to the handle frame at a location spaced above the platform and inclined support member.

10. The cart as claimed in claim 1, wherein the inclined support member comprises a substantially U-shaped frame member comprising a pair of side bars and a cross bar extending between the side bars at the forward end of the support member, the side bars each being secured to the handle frame adjacent the rear end of the platform at the rear end of the support member.

11. The cart as claimed in claim 10, including a pair of support posts extending upwardly from opposite sides of the platform at a location spaced between the front and rear ends of the platform, the support posts having upper ends secured to the support member.

12. A nestable cart, comprising:
a generally flat platform for carrying goods, the platform having a front end, a rear end, and opposite sides, the opposite sides of the platform tapering inwardly from the rear to the front end of the cart;
the platform having a downwardly facing open area extending from the rear end to the front end, the open area being open at the rear end of the platform;
a plurality of wheels supporting the platform above the ground;
an upwardly extending handle frame extending upwardly from the rear end of the cart;
the platform extending forwardly from the handle frame; and
a nesting guide formation extending outwardly from one end of the platform for engaging the platform of a second cart as the two carts are nested together with the platform of the rearward cart engaging beneath the platform of the forward cart.

13. The cart as claimed in claim 12, wherein the wheels include at least a rear pair of wheels and a second pair of wheels spaced forwardly from the rear pair, the platform having upper and lower generally flat faces, and the nesting guide formation being of predetermined shape and dimensions whereby, when a platform of a first cart is nested under the platform of a second, forward cart, the nesting guide formation engages a surface of one of the platforms so as to lift the rear wheels of the forward cart from the ground as the carts are nested together.

14. The cart as claimed in claim 12, wherein the nesting guide formation comprises at least one rotating member.

15. The cart as claimed in claim 14, wherein the rotating member comprises an elongate roller.

16. The cart as claimed in claim 14, wherein the rotating member comprises at least one guide wheel.

17. The cart as claimed in claim 16, wherein the nesting guide formation comprises a pair of spaced guide wheels.

18. The cart as claimed in claim 14, wherein the nesting guide formation comprises at least one bearing.

19. The cart as claimed in claim 12, wherein the nesting guide formation is located at the front end of the platform.

20. The cart as claimed in claim 12, wherein the nesting guide formation is located at the rear end of the platform.

21. The cart as claimed in claim 12, including a basket secured to the handle frame at a location spaced above the platform.

22. The cart as claimed in claim 12, wherein the wheels comprise three spaced pairs of wheels, comprising a rear pair of wheels adjacent the rear end of the platform, a second pair of wheels spaced forwardly from the rear pair of wheels, and a third pair of wheels spaced forwardly from the second pair of wheels, the platform having upper and lower generally flat faces, and the nesting guide formation being of predetermined shape and dimensions whereby, when a platform of a first cart is nested under the platform of a second, forward cart, the nesting guide formation engages a surface of one of the platforms so as to lift the rear and second pairs of wheels from the ground when the carts are nested together.

23. A nestable cart, comprising:
a generally flat platform having a front end, a rear end, and opposite sides, the opposite sides of the platform tapering inwardly from the rear to the front end of the cart;
the platform having a downwardly facing open area extending from the rear end to the front end, the open area being open at the rear end of the platform;
a plurality of wheels supporting the platform above the ground;
an unwardly extending handle frame extending upwardly from the rear end of the cart;
a nesting guide formation extending outwardly from one end of the platform for engaging the platform of a second cart as the two carts are nested together with the platform of the rearward cart engaging beneath the platform of the forward cart; and
an inclined, second support platform extending upwardly and forwardly from a location adjacent the rear end of the platform.

24. A nestable cart, comprising:
a generally flat platform having a front end, a rear end, and opposite sides, the opposite sides of the platform tapering inwardly from the rear to the front end of the cart;
the platform having a downwardly facing open area extending from the rear end to the front end,
a plurality of wheels supporting the platform above the ground, the wheels including at least a rear pair of wheels and a second pair of wheels spaced forwardly from the rear pair;
an upwardly extending handle frame extending upwardly from the rear end of the cart;
at least one rotatable member extending outwardly from one end of the platform for engaging the platform of a second cart as the two carts are nested together with the platform of one of the carts engaging beneath the platform of the other cart; and the nesting guide formation being of predetermined shape and dimensions whereby, when a platform of a first cart is nested under the platform of a second, forward cart, the nesting guide formation engages a surface of one of the platforms so as to lift at least the rear wheels of the forward cart from the ground as the carts are nested together.

25. The cart as claimed in claim 24, wherein the rotatable member comprises at least one guide wheel.

26. The cart as claimed in claim 25, including two guide wheels extending from one end of the platform for engaging the platform of a second cart as the two carts are nested together.

27. The cart as claimed in claim 24, wherein the rotatable member comprises an elongate roller rotatably mounted at one end of the platform.

28. The cart as claimed in claim 24, wherein the platform has an upper face and a lower face, and the rotatable member extends from the rear end of the platform and comprises means for rotatably engaging the upper face of the platform of a second cart as the second cart is moved into nesting engagement with the first-mentioned cart.

29. The cart as claimed in claim 24, wherein the rotatable member extends from the front end of the platform and comprises means for rotatable engagement underneath the platform of a second cart as the platform of the first-mentioned cart is moved into nesting engagement in the open area beneath the platform of the second cart.

30. The cart as claimed in claim 24, wherein the handle frame comprises first and second handle portions extending upwardly from opposite sides of the rear end of the platform, and including a pair of side frames extending forwardly from the handle portions on opposite sides of the frame, each side frame having an upper bar spaced above the platform, and at least two cross bars extending between the upper bars, whereby the cross bars and upper bars comprise a support for elongate items placed over the cross bars.

31. The cart as claimed in claim 30, including spaced posts projecting upwardly from the respective upper bars for restraining items placed over the cross bars from moving laterally off the cross bars.

32. The cart as claimed in claim 30, further comprising at least two wing members pivotally mounted on the side frames for rotation about a pivot axis, each wing member having a first generally flat portion extending from the pivot axis and a second portion extending perpendicular to the first portion, whereby each wing member is rotatable between a deployed condition in which the first portion projects horizontally outwardly from the respective side frame and the second portion projects upwardly at the outermost end of the first portion, and a stored condition in which the first portion projects horizontally inwardly from the respective side frame and the second portion projects downwardly towards the platform, the wing members in the deployed, condition providing an extended support surface for items placed over the cross bars and first portions of the wing members.

33. The cart as claimed in claim 32, wherein at least two wing members are pivotally mounted on each side frame, each wing member being aligned with a wing member on the opposite side frame.

34. The cart as claimed in claim 30, further comprising a first wing member mounted on one of the side frames and a second wing member mounted on the other side member in alignment with the first wing member, each wing member being movable between a first, deployed position in which it projects outwardly from the respective side frame to form an extended support for items placed over the cross bars and wing members, and a second, storage position in which it does not project outwardly beyond the respective side frame.

35. A nestable cart, comprising:

a platform having an upper face, a lower face, a front end, a rear end, and opposite sides, the opposite sides of the platform tapering inwardly from the rear to the front end of the cart;

the platform having a downwardly facing open area extending from the rear end towards the front end;

a plurality of wheels supporting the platform above the ground, the wheels including a rear pair of wheels; an upwardly extending handle frame extending upwardly from the rear end of the cart; and a nesting guide formation extending outwardly from one end of the platform for engaging one face of the platform of a second cart as two carts are nested together, the guide formation being of predetermined shape and dimensions whereby the rear wheels of the forward of the two carts are lifted from the ground when the guide formation engages the platform face of the second cart and are held above the ground when the carts are nested together.

36. The cart as claimed in claim 35, wherein the nesting guide formation comprises at least one rotatable member for rolling over the platform face of the second cart.

37. The cart as claimed in claim 36, wherein the rotatable member is located at the rear end of the platform and engages the upper face of the platform of the second cart during nesting.

38. The cart as claimed in claim 35, wherein the rotatable member is located at the front end of the platform and engages the lower face of the platform of the second cart as the carts are nested together.

39. A cart, comprising:

a first, base platform having a front end, a rear end, and opposite sides;

a plurality of wheels supporting the platform above the ground;

a handle frame extending upwardly from the rear end of the cart and having a handle for pushing the cart at its upper end;

a second, inclined support platform located above the base platform and having a rear end secured adjacent the rear end of the first platform, a front end, and opposite sides, and being inclined upwardly from its rear end to its front end at a predetermined angle to the first platform; and the second platform is inclined upwardly at an angle in the range from 15° to 45° to the base platform.

40. A cart, comprising:

a first, base platform having a front end, a rear end, and opposite sides;

a plurality of wheels supporting the platform above the ground;

a handle frame extending upwardly from the rear end of the cart and having a handle for pushing the cart at its upper end;

a second, inclined support platform located above the base platform and having a rear end secured adjacent the rear end of the first platform, a front end, and opposite sides, and being inclined upwardly from its rear end to its front end at a predetermined angle to the first platform; and the second platform is of approximately equal dimensions to the base platform.

41. A cart, comprising:

a first, base platform having a front end, a rear end, and opposite sides;

a plurality of wheels supporting the platform above the ground, the wheels including a rear pair of wheels adjacent the rear end of the base platform;

a handle frame extending upwardly from the rear end of the cart and having a handle for pushing the cart at its upper end;

a second, inclined support platform located above the base platform and having a rear end secured adjacent the rear end of the first platform, a front end, and opposite sides, and being inclined upwardly from its rear end to its front end at a predetermined angle to the first platform; and the base platform having opposite upper and lower faces, opposite sides of the base platform tapering inwardly from the rear to the front end of the base platform, and a nesting guide formation extending outwardly from one end of the base platform for engaging one face of the base platform of a second cart as two carts are nested together, the guide formation being of predetermined shape and dimensions whereby the rear wheels of the forward cart of two carts being nested are lifted from the ground when the guide formation engages the platform face of the second cart, and are held above the ground when the carts are nested together.

42. A cart, comprising:

a first, base platform having a front end, a rear end, and opposite sides;

a plurality of wheels supporting the platform above the ground;

a handle frame extending upwardly from the rear end of the cart and having a handle for pushing the cart at its upper end;

a second, inclined support platform located above the base platform and having a rear end secured adjacent the rear end of the first platform, a front end, and opposite sides, and being inclined upwardly from its rear end to its front end at a predetermined angle to the first platform; and the opposite sides of the base platform tapering inwardly from the rear to the front end, and at least one rotatable member extending outwardly from one end of the cart for engaging the base platform of a second cart as the two carts are nested together with the base platform of one cart engaging beneath the base platform of the other cart.

43. The cart as claimed in claim 42, including a basket secured to the handle frame at a location spaced above the base and second platforms and extending forwardly from the handle frame.

44. The cart as claimed in claim 43, wherein the basket is of smaller length dimensions than the base and second platforms.

45. The cart as claimed in claim 44, wherein the basket has a rear end and a forward end, and extends forwardly from the handle frame for a distance less than half the length of the base platform.

46. A nestable cart, comprising:

a platform having an upper face, a lower face, a front end, a rear end, and opposite sides, the opposite sides of the platform tapering inwardly from the rear to the front end of the cart;

the platform having a downwardly facing open area extending from the rear end towards the front end;

a plurality of wheels supporting the platform above the ground, the wheels comprising a rear pair of wheels, a second pair of wheels spaced forwardly from the rear pair of wheels, and a third pair of wheels spaced forwardly from the second pair of wheels;

an upwardly extending handle frame extending upwardly from the rear end of the cart; and a nesting guide formation extending outwardly from one end of the platform for engaging an opposing face of the platform of a second cart as two carts are nested together, the guide formation and opposing face of the platform together comprising means for lifting the rear wheels and second pair of wheels of the forward of the two carts from the ground when the guide formation engages the platform face of the second cart, whereby the rear wheels and second pair of wheels of the forward cart are held above the ground when the carts are nested together.

* * * * *